United States Patent
Frydkjær

(10) Patent No.: US 7,261,267 B2
(45) Date of Patent: Aug. 28, 2007

(54) TILT MECHANISM

(75) Inventor: John Frydkjær, Struer (DK)

(73) Assignee: Bang & Olufsen A/S (DK)

( * ) Notice: Subject to any disclaimer, the term of this patent is extended or adjusted under 35 U.S.C. 154(b) by 86 days.

(21) Appl. No.: 10/544,367

(22) PCT Filed: Feb. 3, 2003

(86) PCT No.: PCT/DK03/00066

§ 371 (c)(1),
(2), (4) Date: Aug. 3, 2005

(87) PCT Pub. No.: WO2004/070257

PCT Pub. Date: Aug. 19, 2004

(65) Prior Publication Data

US 2006/0175515 A1    Aug. 10, 2006

(51) Int. Cl.
*E04G 3/00* (2006.01)
(52) U.S. Cl. .................. 248/292.12; 248/292.14; 248/923
(58) Field of Classification Search ........... 248/291.1, 248/292.2, 292.12, 292.13, 292.14, 371, 248/372.1, 395, 919, 921, 922, 923; 108/2, 108/9
See application file for complete search history.

(56) References Cited

U.S. PATENT DOCUMENTS

| 4,427,243 | A | 1/1984 | Miller |
| 4,561,620 | A | 12/1985 | Goetz et al. |
| 5,469,793 | A | 11/1995 | Lindsay |
| 5,715,138 | A | 2/1998 | Choi |
| 6,019,332 | A | 2/2000 | Sweere et al. |
| 6,402,109 | B1 | 6/2002 | Dittmer |
| 6,419,196 | B1* | 7/2002 | Sweere et al. ........... 248/276.1 |
| 6,769,657 | B1* | 8/2004 | Huang .................... 248/278.1 |
| 6,929,224 | B1* | 8/2005 | Masuda et al. .......... 248/176.3 |
| 2004/0084578 | A1* | 5/2004 | Cho et al. ................ 248/125.1 |
| 2004/0211866 | A1* | 10/2004 | Jung et al. ................ 248/133 |
| 2006/0175499 | A1* | 8/2006 | Price et al. .............. 248/278.1 |

FOREIGN PATENT DOCUMENTS

WO    WO 01/35796    5/2001

OTHER PUBLICATIONS

International Search Report; PCT/DK03/000066; Sep. 19, 2003.

* cited by examiner

*Primary Examiner*—Ramon O Ramirez
(74) *Attorney, Agent, or Firm*—Cantor Colburn LLP

(57) ABSTRACT

"Tilt mechanism for a device including a support member for supporting the device, a movable support member and a support structure. The support member is supported by the movable support member and the movable support member is supported by the support structure. The mechanism is further arranged to support the device essentially in a lateral direction of the movable support member, and the device may be supported by the mechanism in a state of equilibrium."

26 Claims, 12 Drawing Sheets

Figure 1:
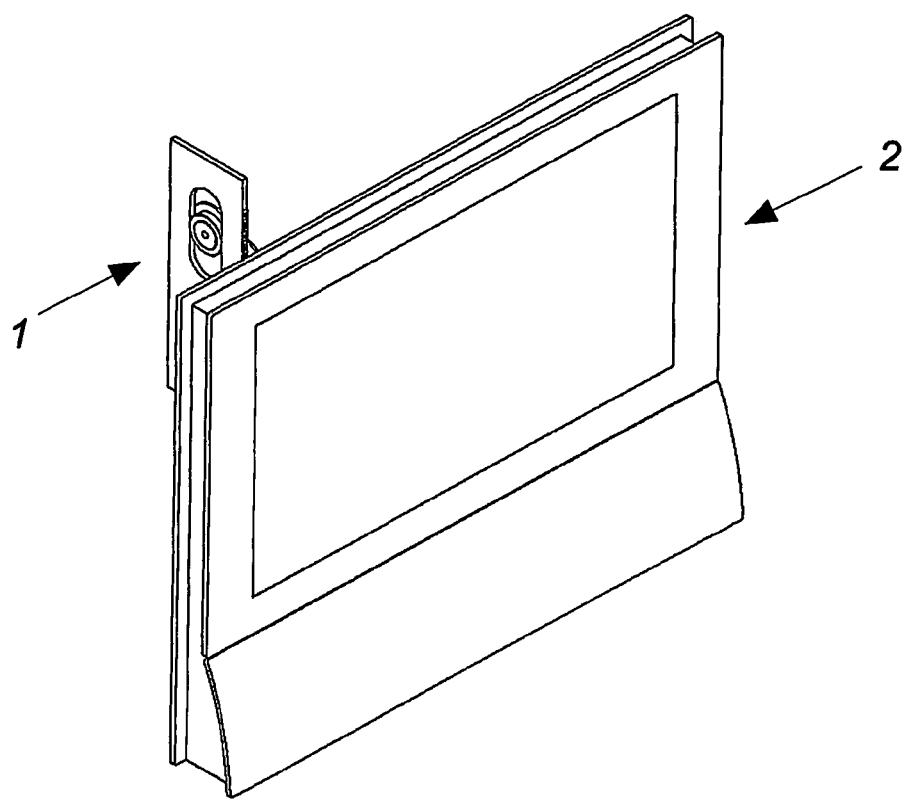

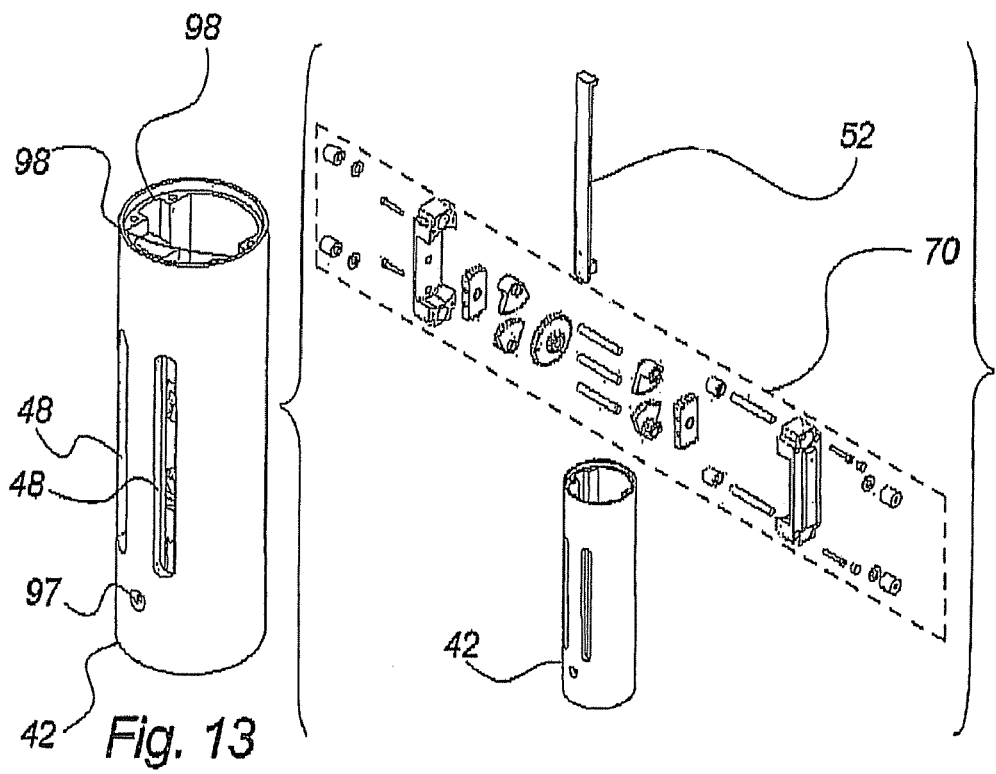
Fig. 13
Fig. 11
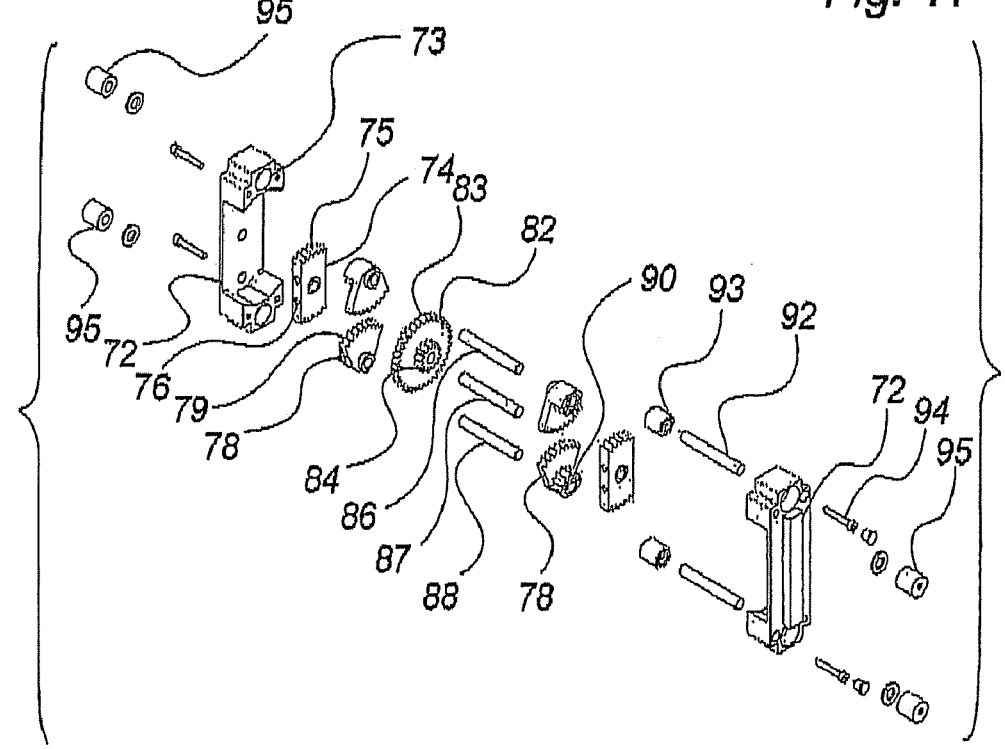
Fig. 12

TILT MECHANISM

FIELD OF THE INVENTION

The invention relates to a tilt mechanism, a display device comprising a display panel, for example a television screen, a computer screen or an information screen, and use of the tilt mechanism.

BACKGROUND OF THE INVENTION

Support arrangements for display devices are designed in numerous variations and some of these provide the possibility of adjusting the position of the display, e.g. for tilting, swiveling etc. of the screen. However, these prior art arrangements are often very complicated and suffer from a number of drawbacks.

An example of such an arrangement is disclosed in U.S. Pat. No. 5,715,138 A. This document relates to an apparatus providing a display with tilting and rotating movements. This apparatus comprises a first housing placed behind the display panel and a second housing placed beneath the panel and the first housing. The first housing contains a number of mechanical elements, e.g. axles, gears, pinions etc. arranged for providing tilting movements of the display supported by means of a pair of brackets carried by a rod. These brackets may be rotated by means of a number of gears, a pinion rack and a pinion knob, i.e. when the pinion knob is turned by hand, the tilt angle of the display panel may be adjusted. Thus, it should be understood that in order to adjust the tilt angle from e.g. a relatively large downwards tilt to e.g. a relatively large upwards tilt, the user will have to turn the pinion knob a large number of revolutions, which makes such adjustments time-consuming. Further, this prior art mechanism suffers from the drawback that the display panel is not suspended in a balanced arrangement as the display panel is rotated in relation to the rod placed behind the panel. Thus, the mass and the center of gravity of the panel are displaced when adjusting the tilt angle, whereby force is required to perform a displacement upwards, especially if the panel in question is of a relatively large size. Further, it should be understood that special measures may be required to prevent the panel from dropping downwards if the mass of the display panel is relatively large.

A self-balancing mounting system for a flat panel display is disclosed in U.S. Pat. No. 6,402,109 B1. This prior art system is relatively large and complicated as it comprises a first bracket for mounting to a wall, a second bracket for mounting the display panel, a pair of minor arms, a pair of major arms and connecting arms. These elements are connected pivotally and/or in a sliding connection. A display panel mounted on the second bracket may be placed in a range of positions, among which one is a state of equilibrium. The panel will remain in the other positions since any biasing force will be offset by friction inherent in the system in these positions.

U.S. Pat. No. 4,427,243 A describes a display station tilt mechanism for a cathode-ray tube (CRT) viewing screen. The screen is secured by a hinge to a base for tilting from a vertical position, in which it is substantially balanced, through positions of progressively increased tilt, in which the weight of the tube and associated parts becomes progressively displaced and the screen becomes more unbalanced. In order to compensate for this unbalance, an arrangement comprising a camming bracket and a spring is arranged, whereby the viewing screen is counterbalanced in all possible positions.

Further, display panel support arrangements featuring support arms and tilt mechanisms are known for mounting to a wall or for support in relation to a base stand. Examples of such prior art systems are described in U.S. Pat. No. 6,019,332 A and WO 01/35796 A1. However, such systems all rely on friction mechanisms and/or spring mechanisms, e.g. mechanical springs, gas springs etc., in order to keep the display device in a balanced state. Therefore, these systems are sensitive to variations in load, e.g. the weight of a display panel, and they may thus only be used in connection with a display having a specific weight or they may require adjustment when being used in connection with a display panel having a weight outside a predetermined weight range.

Finally, U.S. Pat. No. 4,561,620 A describes a tiltable cathode-ray tube display device structure for adjusting the tilt angle of a display unit placed immediately on a tray support, e.g. a table stand. The tray support and the display unit feature curved guiding means, and the tray support and the display unit may be displaced in relation to each other by means of a gear mechanism. The radius of curvature of the curved guiding means corresponds to the distance from the curved guiding means to the center of gravity, and the center of gravity is located above the curved guiding means. Thus, the movement of the center of gravity is minimized and the display unit will remain substantially in balance with the tilt range. However, this device is dedicated to a cathode-ray display arrangement and requires a support tray located immediately under the display unit.

It is an objective of the invention to provide an improved tilt mechanism or arrangement.

It is a further objective of the invention to provide a tilt mechanism or arrangement which does not suffer from the drawbacks related to the prior art techniques.

It is also an objective of the invention to provide a tilt system suitable for a multitude of devices.

In particular, it is an objective of the invention to provide a tilt system suitable for display devices such as viewing screens, information systems, computer screens, monitoring and/or television screens etc., and particularly flat panel screens such as liquid crystal displays (LCD), thin film transistor (TFT) displays, plasma display panels (PDP) or the like.

It is a further objective of the invention to provide such a system or mechanism with a balanced arrangement without the use of special means, e.g. counterbalancing means such as springs etc.

It is also an objective of the invention to provide a versatile system or mechanism which may be utilized in connection with a wide range of applications and in connection with a wall mount, a floor stand, a table stand etc.

It is a further objective of the invention to provide a system or mechanism which may be designed in a compact manner and which may readily be integrated in the device, e.g. the display panel and/or its support.

These and other objectives are achieved by the invention as explained in the following.

SUMMARY OF THE INVENTION

The invention relates to a tilt mechanism for a device, said mechanism comprising a support member for supporting said device, a movable support member, a support structure, wherein
said support member is supported by said movable support member, and
said movable support member is supported by said support structure, and wherein said mechanism is arranged for supporting said device essentially in a lateral direction of said movable support member.

Hereby, an arrangement is achieved which provides an adjustable tilt angle of a device, e.g. in particular a display panel, a flat display panel or the like. Since a movable support member is included in the arrangement, and situated directly or indirectly between the support structure and the supporting member, a relative displacement of the device fixed to the support member, and its center of gravity will be performed by this mechanism, when an adjustment of the tilt angle of the device is performed. If the device is tilted in a downwards direction, whereby the center of gravity is relatively displaced downwards, an upwards movement of the movable support member will occur, whereby the resulting displacement of the device and its center of gravity, at least in a vertical direction, is minimized and preferably eliminated. It should thus be understood that the device will remain in a balanced state, i.e. a state of equilibrium, and that the device will remain in the new position without the assistance of any friction means, springs etc. Further, it should be understood that when the device is tilted downwards, no loss in potential energy will take place. Correspondingly, when the device is tilted in an upwards direction, no gain in potential energy will take place. Therefore, when turning the device upwards, no energy will be required apart from energy for surmounting friction such as friction in bearings etc. Also, the device will not tend to tilt downwards under the influence of gravity when left in a tilted position.

In an advantageous embodiment said support structure may comprise a part extending in an essentially vertical direction.

Hereby, the device, e.g. a display device, may be supported near or adjacent to said support structure, which results in a compact arrangement. Further, said support structure may be designed in a versatile manner e.g. as a wall mount, a table stand or a floor stand.

Advantageously said support member may be arranged for transferring rotational movement and in an essentially transverse direction in relation to said support structure.

Hereby, a device, e.g. a display panel may be connected directly to said device, e.g. at the rear of this device.

In a further advantageous embodiment said support member and said movable support member may be linked in such a manner that a forward tilt of said support member corresponds to an upwards displacement of said movable support member and vice versa.

By this embodiment the center of gravity of a supported device, e.g. a display panel, may remain in same position or in essentially the same position.

Preferably said support structure may comprise means for guiding said movable support member. Hereby, the position of a supported device and in particular the position of the center of gravity of such a device may be controlled, e.g. in order to achieve a state of equilibrium.

In an advantageous embodiment said means for guiding said movable support member may be designed for rectilinear guidance. Hereby, the control of the position of a supported device and in particular the position of the center of gravity of such a device is achieved in a particularly uncomplicated manner, whereby the means included in the guiding system may be manufactured in a cost-effective way.

In a further advantageous embodiment said means for guiding said movable support member may be designed for non-rectilinear guidance, e.g. curved guidance, part-circular guidance etc. Hereby, control of the position of a supported device, and in particular the position of the center of gravity of such a device, is achieved in a manner which allows for accurate control of the position of the center of gravity, e.g. a state of equilibrium. Thus, this embodiment allows for a particularly stable arrangement which may be operated with very little effort, e.g. when adjusting the tilt angle.

Preferably said movable support member may comprise corresponding guiding means for cooperation with said guiding means comprised by the support structure.

Advantageously said guiding means and/or said corresponding guiding means may comprise an aperture, a recess, a slot, a roller, a rail and/or a tap. Hereby, said guiding means may be provided in a form readily available and/or easily manufactured while simultaneously providing an efficient guidance. Further, such guidance may be provided in a form presenting only minor friction in this manner, thereby further enhancing the user-friendliness of a mechanism according to the invention.

In an advantageous form said support member may be connected to said movable support member in a fixed relationship. Hereby, a particularly uncomplicated system is achieved, requiring only few components. Movable components such as wheels etc. may be restricted to the movable support member in this embodiment.

In a further advantageous form,
an intermediate member for transferring rotational movement may be comprised,
said support member may be arranged for transferring rotational movement,
said movable support member may provide support to said support member and said intermediate member,
said support structure may comprise force-transferring means,
said support member and said intermediate member may be linked, and
said intermediate member may comprise means for transferring rotational movement to displacement in relation to said support structure.

By this embodiment, control of the position of a supported device, and in particular the center of gravity of this, may be performed by using a particularly uncomplicated support structure, since this embodiment does not require curved guidance of the movable support member. The support structure may thus be relatively slim in design and with guiding means that may be designed rectilinearly.

Preferably said support member may be pivotally supported by said movable support member.

In a preferred embodiment said intermediate member may be pivotally supported by said movable support member.

In a further preferred embodiment said movable support member may be translatorily supported by said support structure.

In yet another preferred embodiment said support member and said intermediate member may be linked by means of force-transferring means.

Advantageously said force-transferring means may feature a toothed surface, e.g. in the form of a gear wheel or a section of a gear wheel.

In an advantageous embodiment said support structure may comprise an element for direct or indirect interaction with said intermediate member. By means of this element, controlled displacement of the movable member in relation to the support structure may be performed in a relatively simple manner.

Advantageously said element for interaction with said intermediate member may feature a toothed surface, for example in the form of a pinion rack, whereby said controlled displacement of the movable member in relation to the support structure may be provided by using readily available and/or easily manufactured elements.

Preferably said intermediate member may feature a toothed surface, for example in the form of a gear wheel or a section of a gear wheel, for interaction with the support structure. Said intermediate member may conveniently establish the connection to the support structure, e.g. a corresponding part such as a pinion rack on the support structure.

In a further preferred form the mechanism may comprise at least one further element for establishing said indirect interaction between said intermediate member and said support structure. Hereby, a number of advantages may be achieved, one being that a compact construction may be designed since such a further element may serve to change the direction of rotation, introduce a gearing etc.

Advantageously said at least one further element may be in the form of a gear wheel or at least a section of a gear wheel.

In an advantageous embodiment said mechanism may comprise a casing for enclosing at least part of said mechanism. Hereby, a compact and robust construction may be achieved which is also aesthetically appealing in appearance.

In a further advantageous embodiment said casing may be structurally connected to said support structure.

Preferably said movable support member may comprise a frame having guiding means, e.g. guiding rollers, for cooperation with corresponding means located in said support structure or in a part of this. Hereby, a compact and robust construction may be achieved.

Advantageously said mechanism may further comprise a swivel mechanism which may form part of the support structure. Hereby, the mechanism provides the advantage of being capable of performing adjustments of the angular position of e.g. a display panel as well, whereby userfriendliness is further enhanced. Furthermore, this option may be provided in a manner only requiring few additional components.

The invention also relates to a display device comprising a display panel, for example a television screen, a computer screen or an information screen, providing support to said display panel on a wall, on a floor or on an analogous structure. According to the invention, said display device comprises a tilt mechanism.

Hereby, a display panel may be situated in any position within a range of positions, e.g. in order to facilitate convenient and unobstructed view for the user. Thus, a user may adjust the angle of the screen or display panel in order to avoid glare, in order to attain a better view etc. Further, this is achieved in an effortless manner, as previously explained, since the user may change the tilt angle by using very little effort, since the display device is supported in such a manner that the center of gravity will remain essentially in the same location, at least in the vertical direction, when the tilt angle is changed.

It should be understood that the tilt angle will be limited to a range of angles in practice, which are determined by factors such as position of support structure, size of the display panel etc. Thus, an upper limit may be determined by the angle at which an upper part of a display screen touches an upper part of a support structure, a wall or a similar part. Correspondingly, a lower limit may be determined by the angle at which a lower part of a display screen touches a lower part of support structure, a wall or a similar part.

Preferably, a mechanism according to the invention may be adjustable within a range of +20°/−30°, determined in relation to a vertical axis (+ indicating an upwards tilted angle, − indicating a downwards tilted angle). However, it should be understood that numerous ranges may be considered in practice, both symmetrical and asymmetrical ranges. It should also be understood that other upper and/or lower limits than those indicated in the example above may be practicable and handled by an apparatus according to the invention.

Advantageously said display panel may be a flat screen display. In many cases, a correct viewing angle will be especially important when flat screen displays are used, since the viewing quality in connection with these screens generally depends on the angle, i.e. the recommended viewing angle is generally within a small range. Therefore, a combination of a mechanism in accordance with the invention with a flat screen display will be particularly effective and valuable. The ease of adjustment and/or the adjustment range will be particularly advantageous to the user or users.

Finally, the invention relates to use of a tilt mechanism for a display device comprising a display panel, for example a television screen, a computer screen or an information screen.

THE FIGURES

Figure 2:
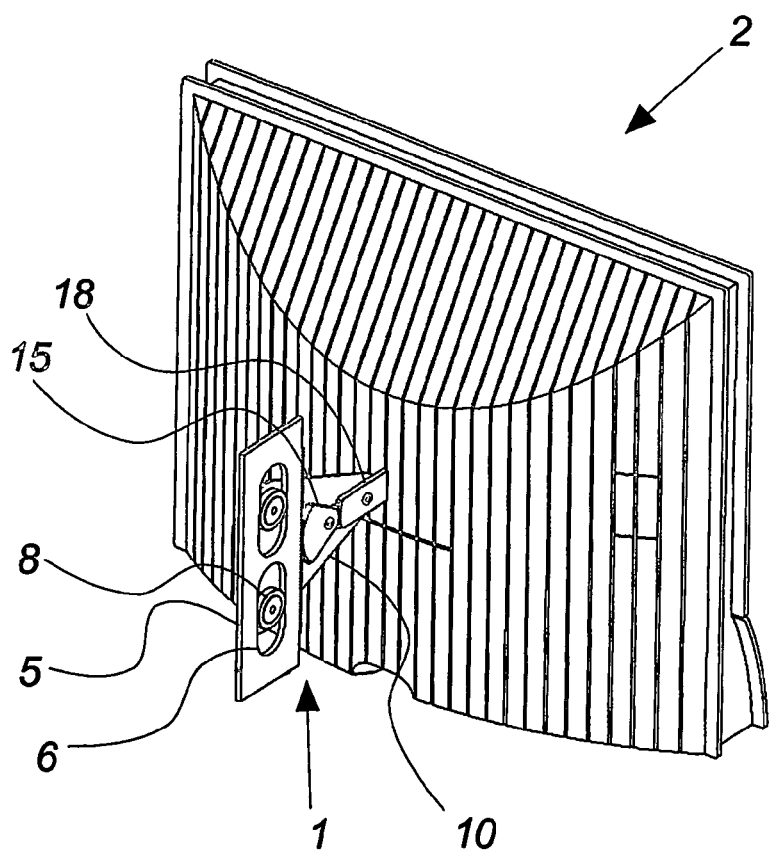
Figure 3:
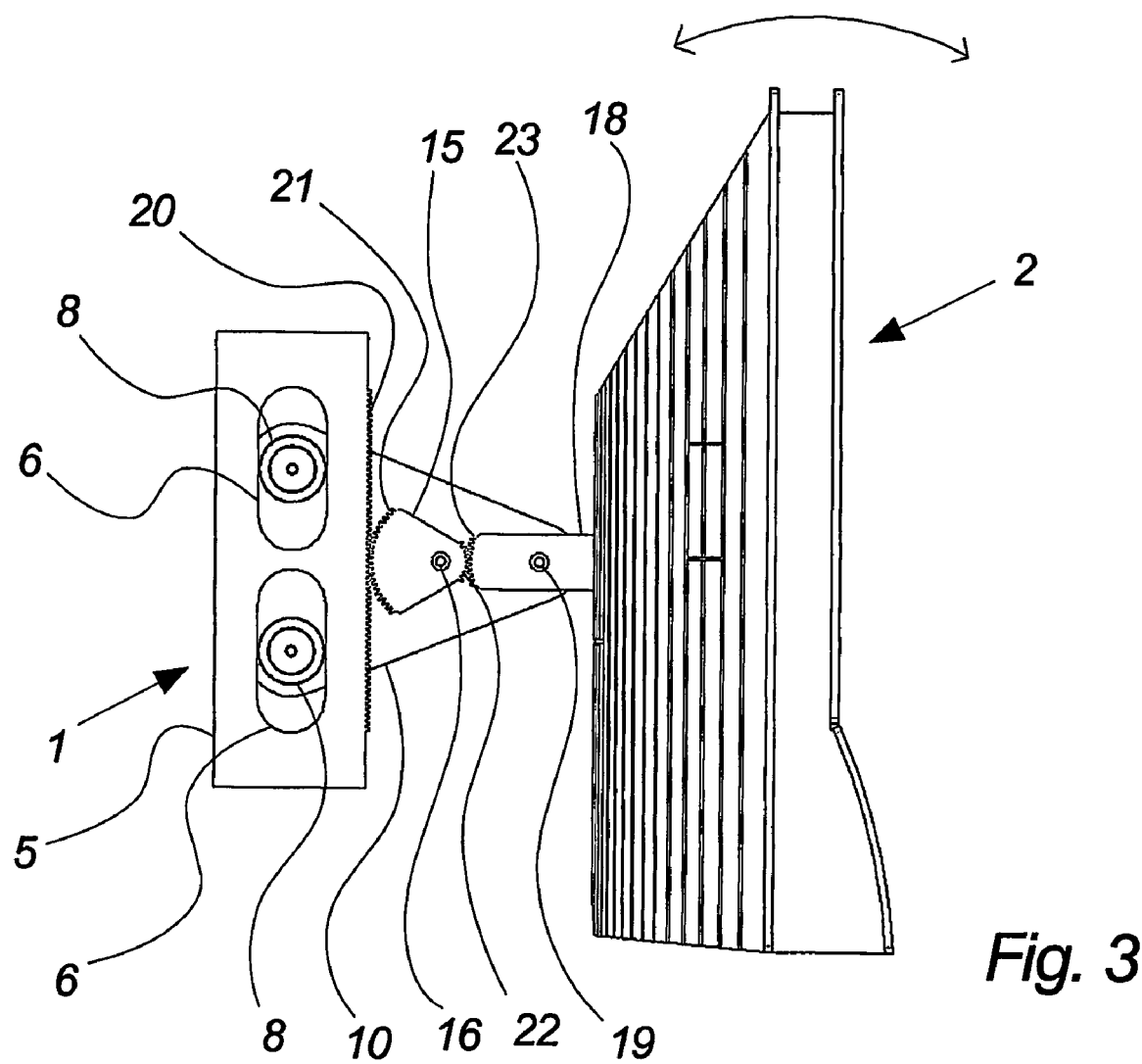
Figure 4:
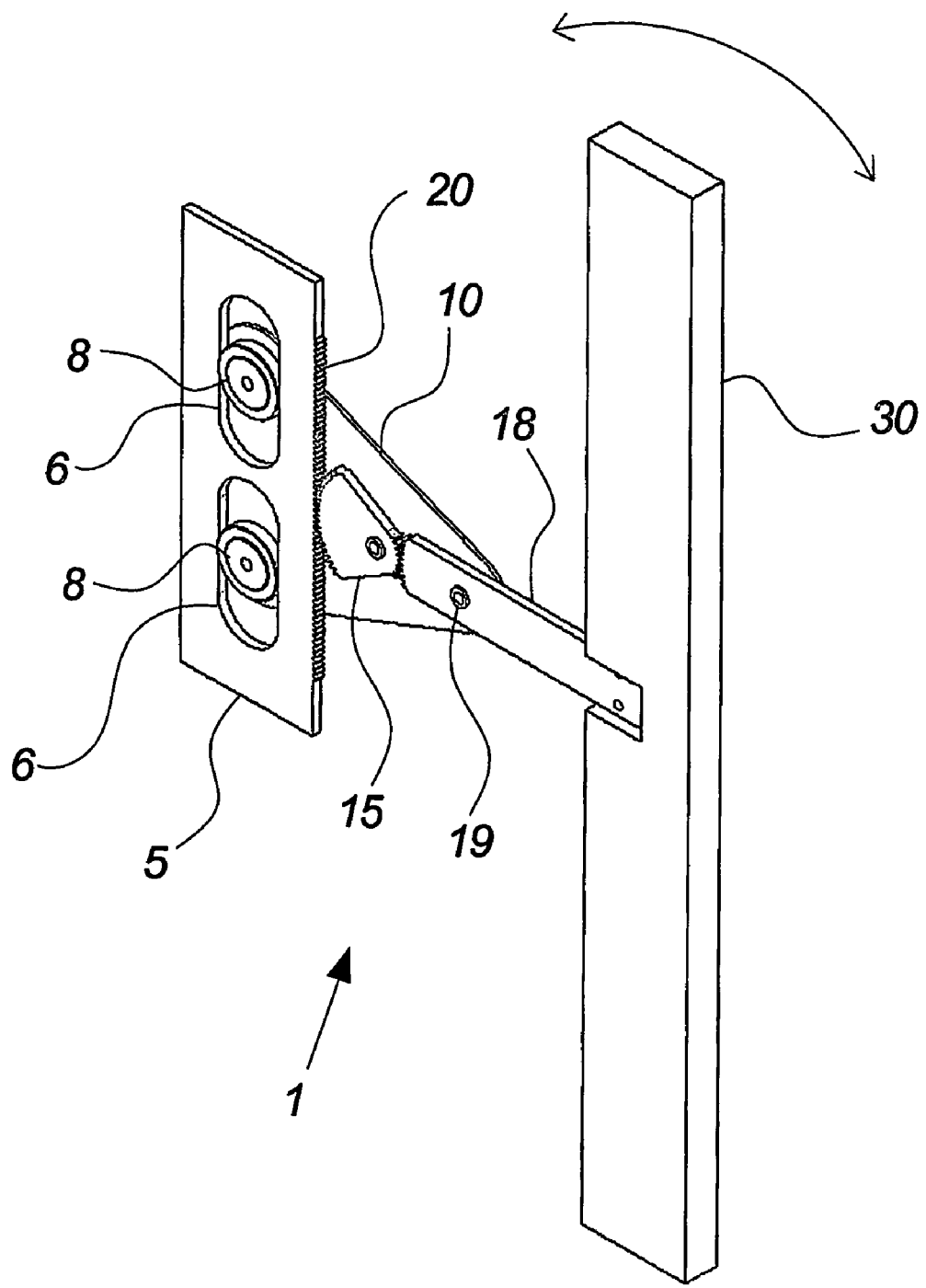
Figure 5:
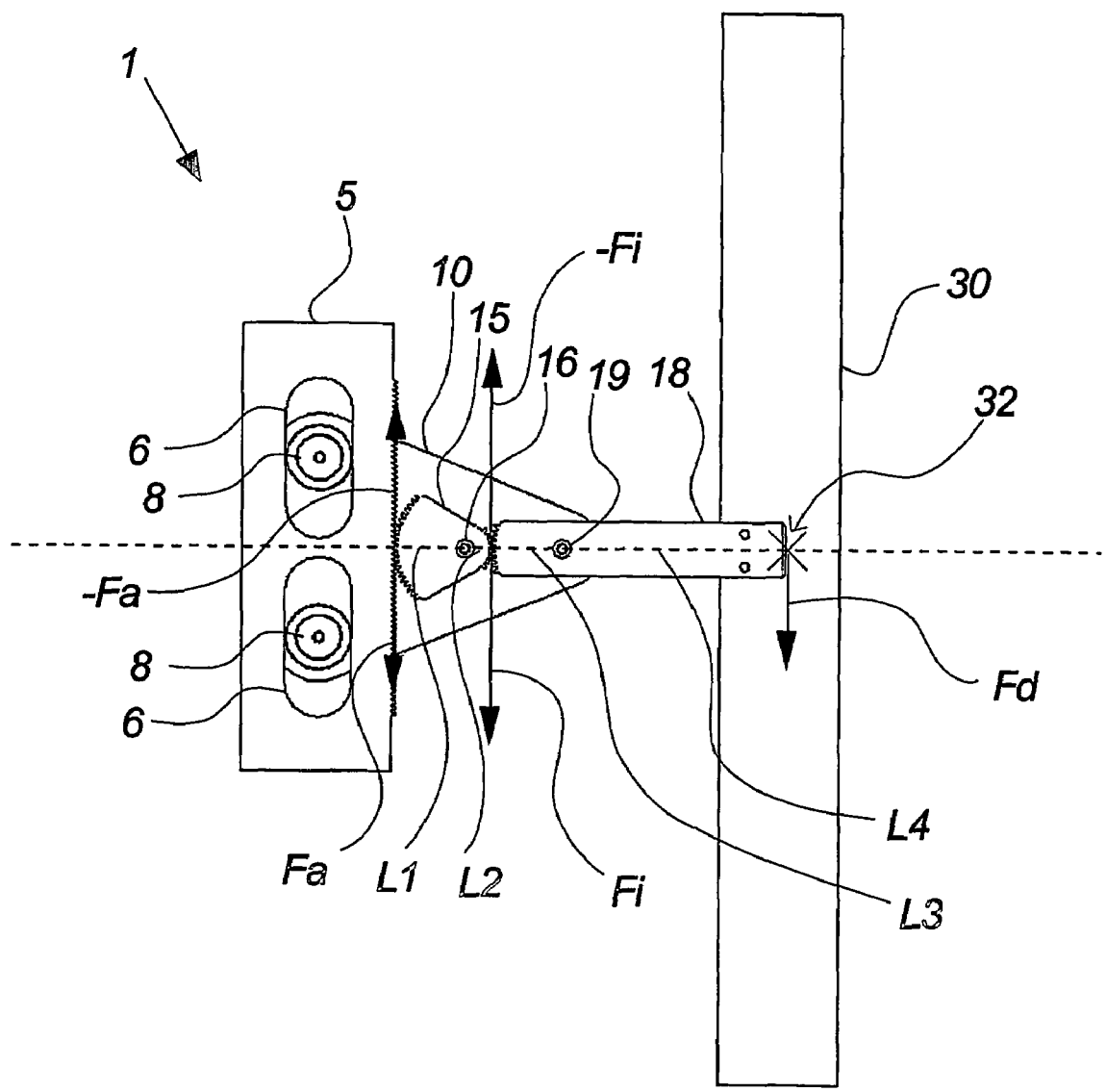
Figure 6:
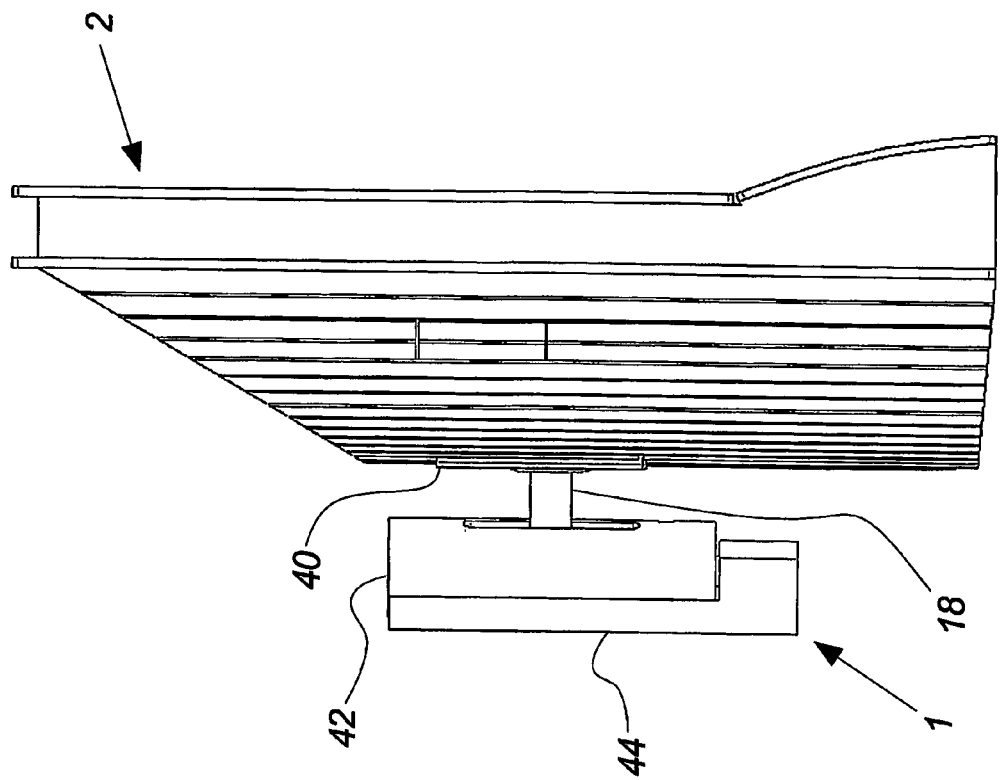
Figure 7:
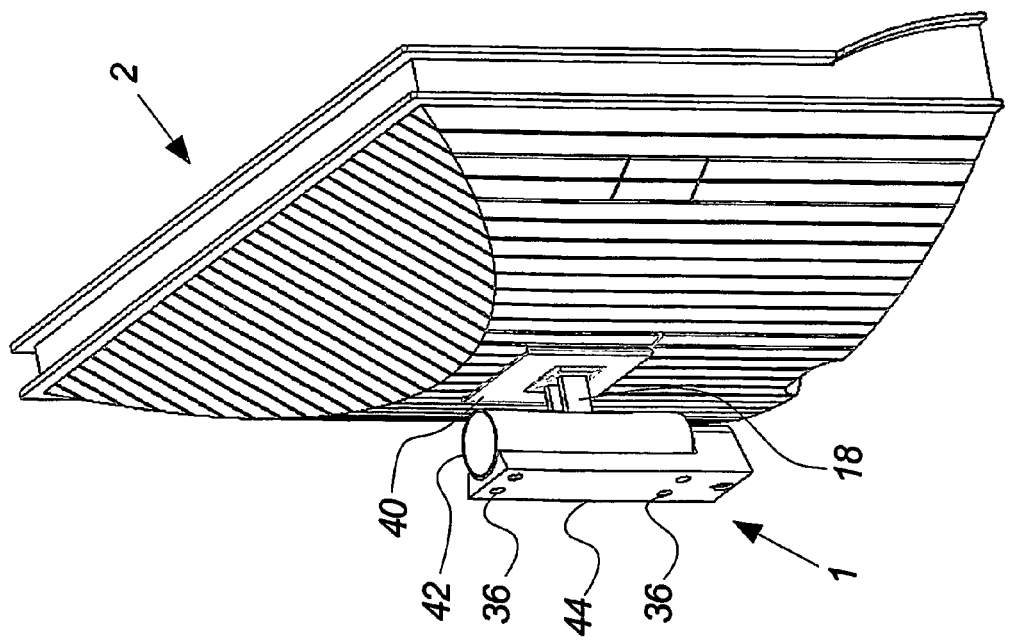
Figure 8:
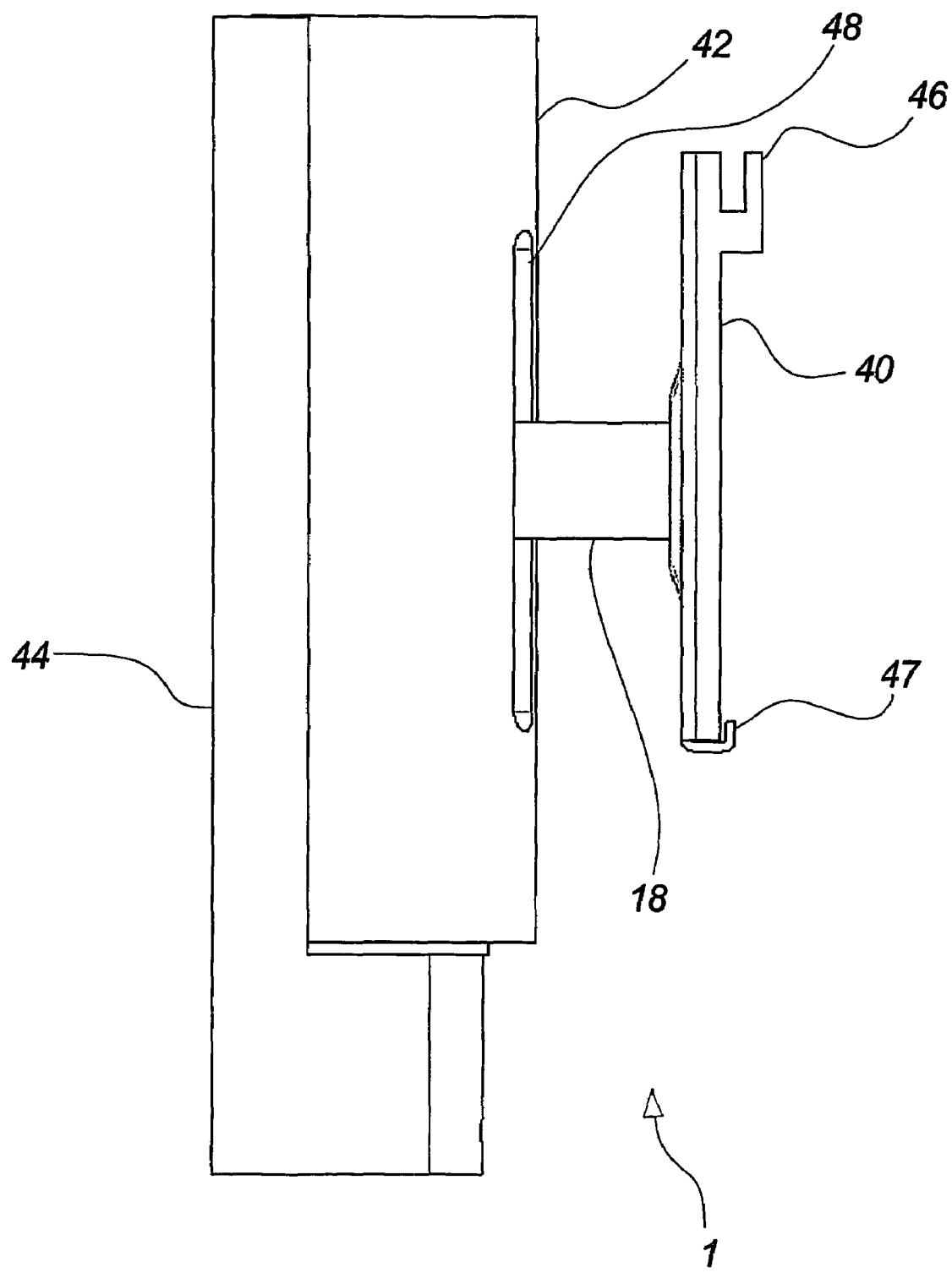
Figure 9:
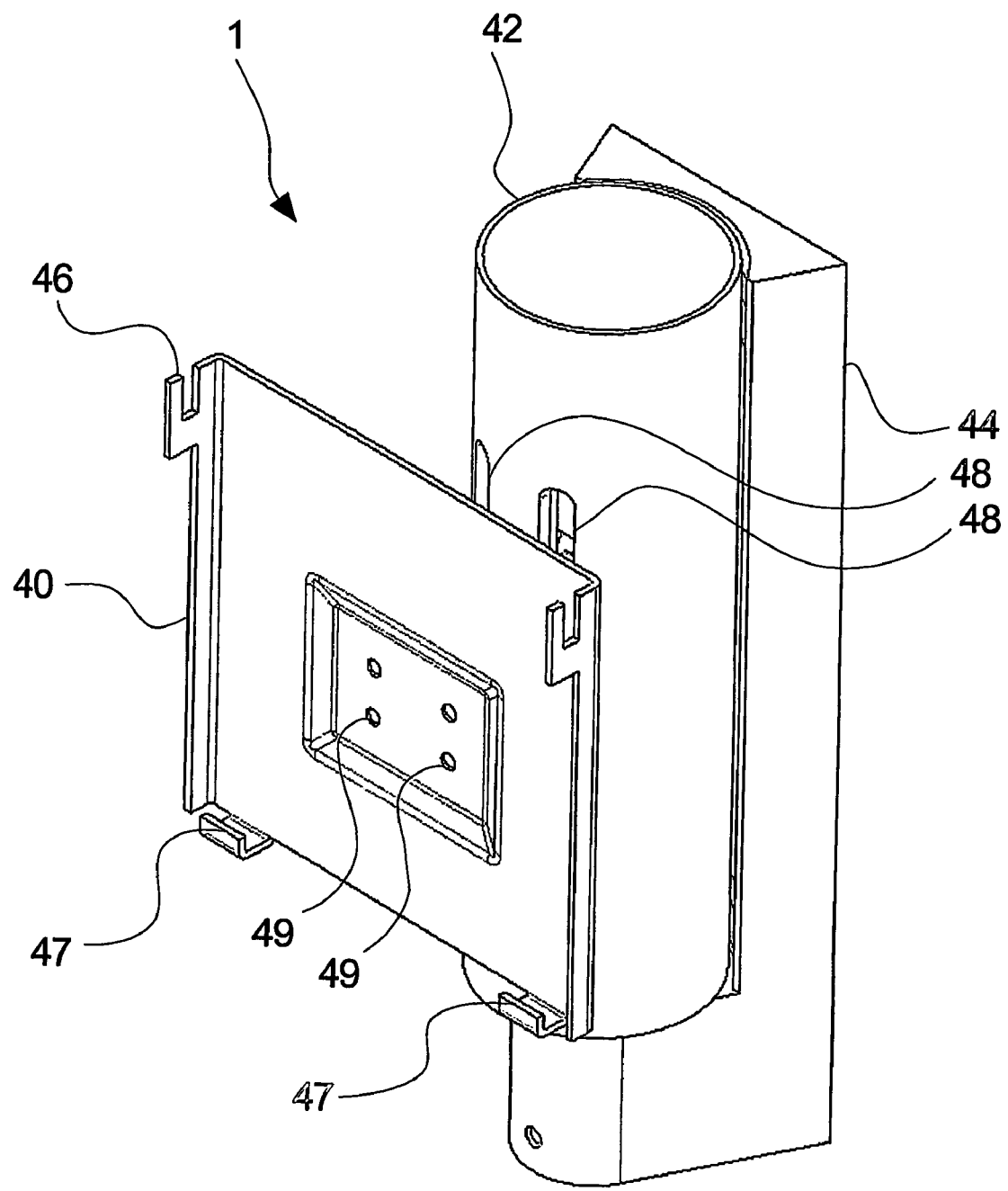
Figure 10:
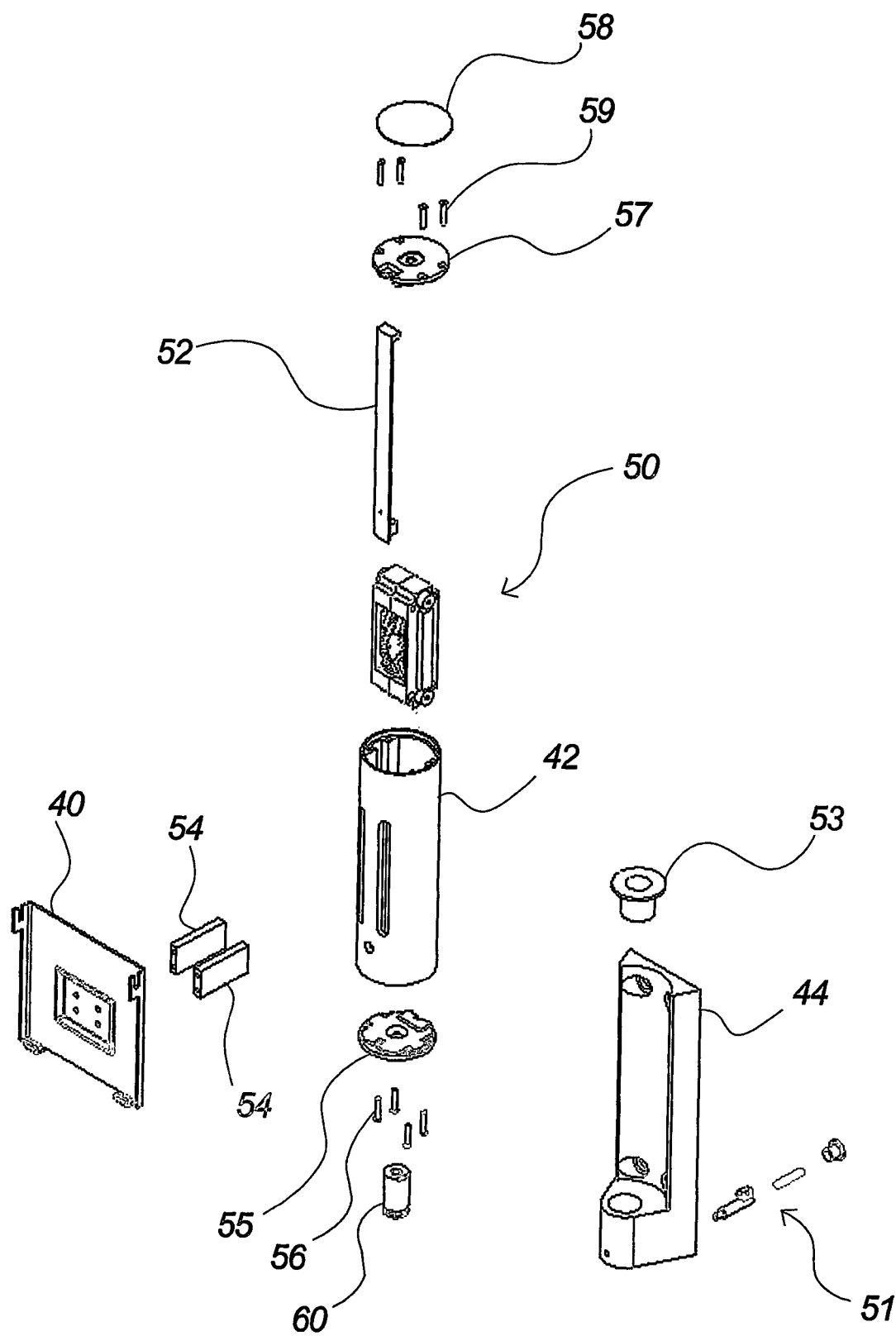
Figure 14:
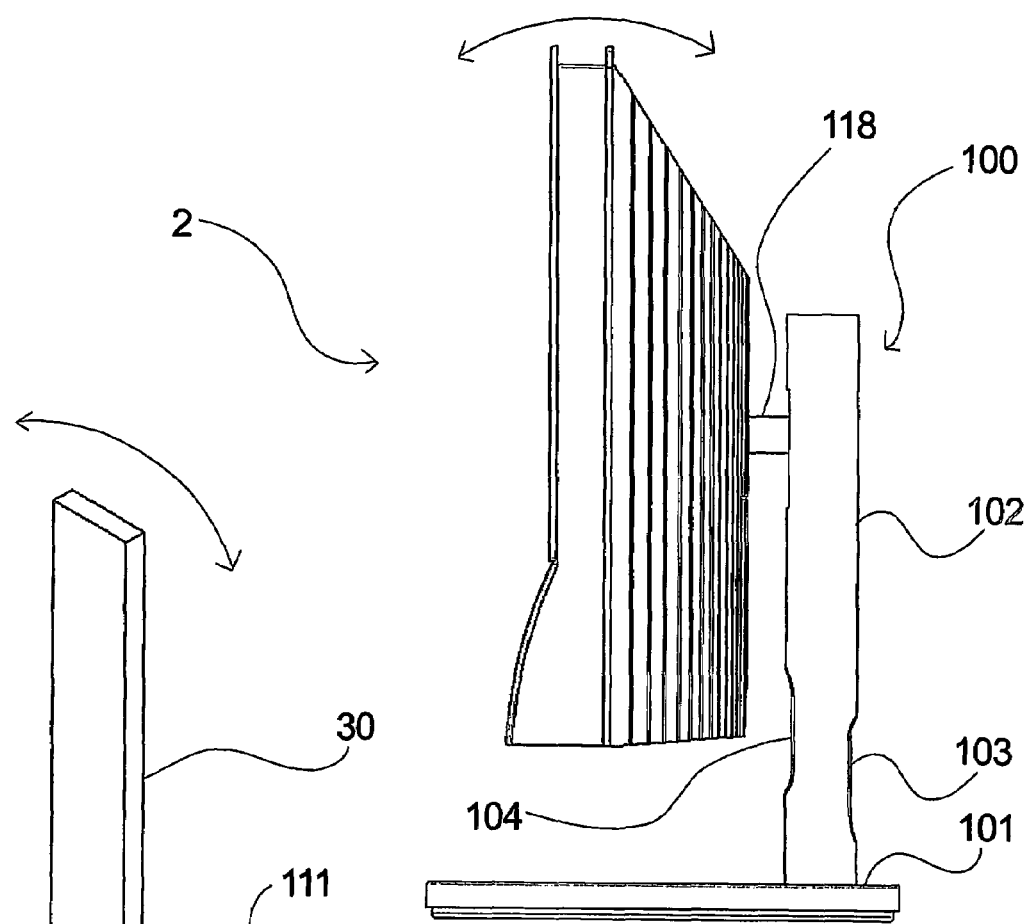
Figure 15:
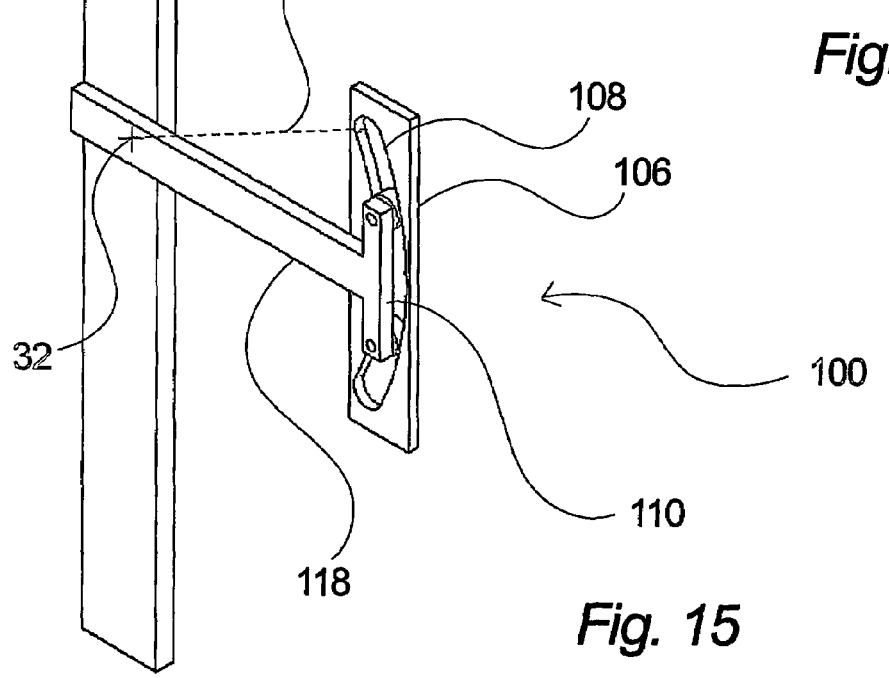
Figure 16:
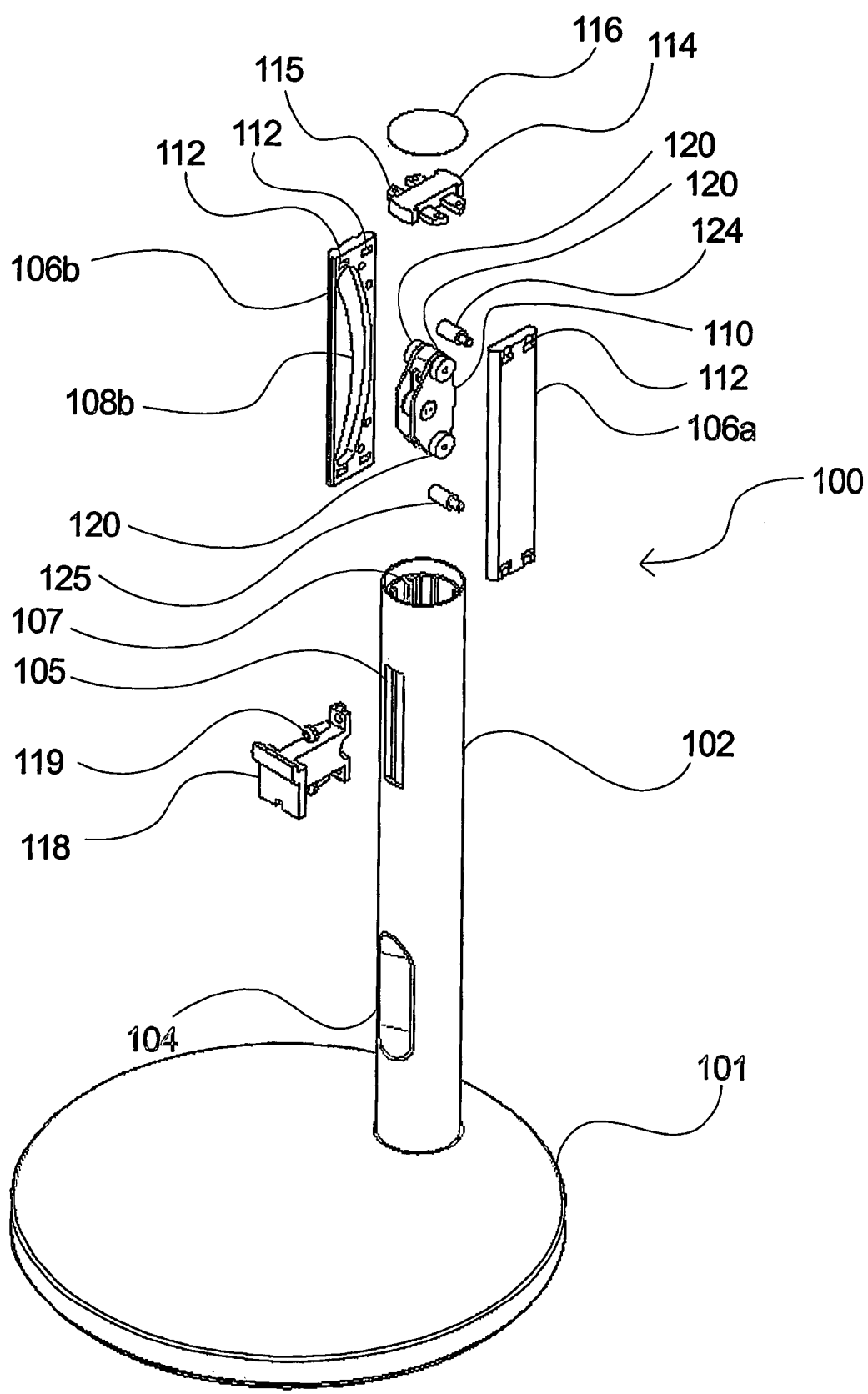
Figure 17:
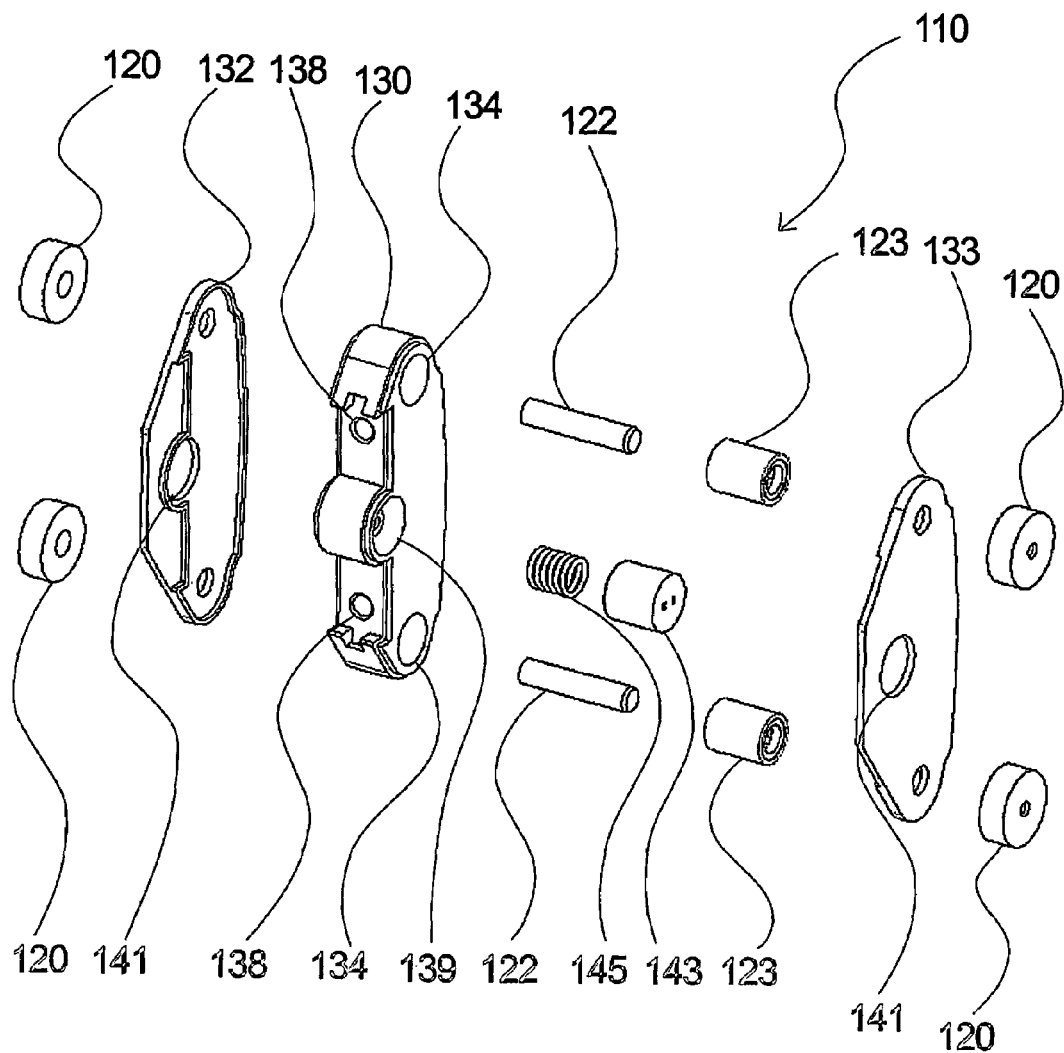

The invention will be explained in further detail below with reference to the figures of which FIG. 1 shows a mechanism according to an embodiment of the invention in connection with a display screen seen in a perspective view from the front of the screen, FIG. 2 shows the mechanism illustrated in FIG. 1, but in a perspective view seen from the rear of the display screen, FIG. 3 shows the mechanism in FIGS. 1 and 2 seen from the side, FIG. 4 is a perspective view of the mechanism according to an embodiment of the invention carrying a schematically illustrated item, FIG. 5 is a side view of the embodiment shown in FIG. 4, FIG. 6 shows a mechanism according to another embodiment of the invention in connection with a display screen in a perspective view from the rear of the screen, FIG. 7 is a side view of the embodiment shown in FIG. 6, FIG. 8 is a side view of a tilt mechanism according to the embodiment shown in FIGS. 6 and 7, FIG. 9 is a perspective view of the mechanism shown in FIG. 8, FIG. 10 is an exploded view of elements of the mechanism according to the embodiment shown in FIGS. 6-9, FIG. 11 is a large-scale and exploded view of elements of the mechanism comprised in the support structure, FIG. 12 is a large-scale and exploded view of elements comprised in a movable support member according to this embodiment of the invention, FIG. 13 is a perspective view of a casing element for a mechanism according to the embodiment shown in FIG. 11, FIG. 14 is a side view of a further embodiment of the invention, FIG. 15 shows the mechanism according to the embodiment shown in FIG. 14 schematically, FIG. 16 is a partly exploded view of the main elements of this embodiment, and FIG. 17 is an exploded view of a movable support member according to this embodiment.

DETAILED DESCRIPTION

A mechanism according to a first embodiment of the invention is illustrated in FIG. 1. The mechanism is generally designated 1 and is connected to a display screen or a display panel generally designated 2. This display screen may be a computer screen, a television screen or the like. Further, the screen or panel may be a cathode ray tube screen or a flat screen terminal such as a liquid crystal display (LCD), a plasma display panel (PDP) or the like. However, it should be understood that the mechanism according to the invention may be utilized in other applications, e.g. in connection with numerous other devices and items, in connection with which it is desirable to be able to perform an adjustment of an angle between two elements, e.g. support to an item such as an apparatus and the item itself.

FIG. 2 corresponds to FIG. 1, but FIG. 2 shows the mechanism from the rear. The mechanism 1 is shown schematically and it should be understood that the elements comprised in the mechanism may be designed in numerous manners suitable for the particular applications. The mechanism comprises a support structure 5, which is a rectangular plate member in the illustrated form, but which may be designed as or connected to a wall mount, a structure on the floor or the like. The support structure has a pair of slots, apertures 6 or the like for guiding rollers 8 or other guiding means which are supported by or form part of a movable support member 10. This movable support member 10 also provides support for an intermediate support member 15 and a support member 18. The support member 18 is connected to the display panel 2, e.g. on the back of the panel 2.

This embodiment of the invention should be described in further detail with reference to FIG. 3 which shows the arrangement from the side. Again, it should be understood that the support structure 5 may be statically fixed, e.g. to a wall, supported on the floor by commonly utilized means (not shown) etc. In addition to the elements described in connection with FIG. 2, it is shown that the intermediate support member 15 is pivotally connected to the movable support member 10 by means of a pin, an axle tap or similar means 16. Similarly, the support member 18 is pivotally connected to the movable support member 10 by means of a pin, an axle tap or similar means 19. The support structure 5 comprises a part 20 having a toothed surface, e.g. in the form of a pinion rack. This meshes with a toothed part 21, e.g. a first gear portion on one end of the intermediate support member 15. This support member further comprises a second gear portion 22 opposing the first gear portion 21. This second gear portion 22 meshes with a toothed part, e.g. a gear portion 23, on the support member 18.

As indicated by the curved arrow on FIG. 3, the display screen 2 may be tilted in relation to the support structure 5. When the display screen 2 is tilted forward, e.g. by pulling the upper part of the display screen to the right in FIG. 3, the left part of the support member 18 will move upwards. The meshing of the gear portions 23 and 22 will cause the right end of the intermediate support member 15 to move upwards. Simultaneously, the left end of the intermediate support member 15 will move downwards in relation to its axis, which may e.g. be the axle pin 16 mounted on the movable support member 10. The meshing of the gear portion 21 and the toothed surface 20 on the support structure 5 will exercise force on the movable support member 10 in an upwards direction, and since the movable support member 10 is guided by the rollers 8 in the apertures 6, the movable support member 10 will be displaced upwards in a direction parallel with the longitudinal axis of the apertures 6. However, since the support member 18 is simultaneously tilted downwards, the display panel 2 or rather the center of gravity of this will remain in the same position or essentially in the same position. Thus, it should be understood that that the display panel 2 will remain in any position, such as the tilted angle at which it is placed and that an adjustment of the position, i.e. the tilted angle, may be performed by using practically no energy apart from the actual amount of energy or force sufficient to overcome friction, static friction etc.

Similarly, when the display screen 2 is tilted back, e.g. by pushing the upper part of the display screen to the left in FIG. 3, the movable support member 10, and thus also the display panel 2, will be displaced downwards in a direction parallel with the longitudinal axis of the apertures 6.

Hereby, the display panel 2 will be balanced, e.g. supported in a state of equilibrium, in the positions which may be assumed by the panel. This will be further explained with reference to FIG. 4 and in particular FIG. 5. These figures show a mechanism as described above a schematically sketched item 30 instead of a display panel 2. It should be understood that the item 30 may designate a display panel or any other piece of equipment or apparatus.

FIG. 4 is a perspective view of the mechanism, showing the elements already described above. A connection between the support member 18 and the item 30 is also illustrated and the design of the part 20 as a pinion rack is also illustrated. It should be understood that instead of a pinion rack and instead of gear parts on the intermediate support member 15 and/or the support member 18, other means of transferring force may be utilized. Further, it should be understood that a further movable support member (not shown), e.g. in the form of a plate corresponding to the illustrated support member 10, may be applied to the mechanism and placed on the other side of the members 15 and 18, whereby the mechanism may be strengthened, for example by improving the fixing of the axle pins 16 and 19 and thus improving reliability and stability.

FIG. 5 shows a side view of this embodiment. The center of gravity 32 of the item 30 has been marked, and a short dash line has been drawn through the rotational centers of the support member 18, the intermediate support member 15 and the line of contact between the support structure 5 and the intermediate member. If the center of gravity 32 of the item 30 is not located on this line, it should be understood that the center of gravity may be projected on the line.

For the purpose of the following, it is assumed that the item 30 is balanced and that a state of equilibrium is present. The mass of the item 30 (including the support member 18) is designated m and the mass of the movable support member 10, the intermediate support member 15, axle pins etc. is designated $m_2$.

As indicated in FIG. 5 the distance from the point of contact between the support structure 5 and the intermediate support member 15 to the axis 16 is designated $L_1$, the distance between the axis 16 and the point of contact between the intermediate support member 15 and the support member 18 is designated $L_2$, the distance between the point of contact between the intermediate support member 15 and the support member 18 and the axis 19 is designated $L_3$, and the distance between the axis 19 and the center of gravity 32 is designated $L_4$.

The item 30 will be affected by a force Fd, i.e. a force of gravity:

$$Fd = m*g, \text{ where } g \text{ is the gravitational constant} \quad (I)$$

Further, the support member 18 will be affected by a force Fi at its left end. This will correspond to a force −Fi affecting the right end of the intermediate support member 15 (the negative sign indicating that −Fi is directed in the opposite direction of Fi). The left end of the intermediate support member will be affected by a force directed upwards, −Fa. This force corresponds to a force, Fa, directed downwards, whereby the intermediate support member affects the support structure. This force, Fa, stems from the mass of the elements supported by the support structure, e.g. the item 30, the movable support member 10, the intermediate support member 15, etc. affected by gravity.

Thus, $$Fa = (m+m_2)*g \quad (II)$$

Since the mechanism is in resting position, e.g. balanced or in a state of equilibrium, no resulting torque is exerted on the pivotally fixed elements, i.e. the intermediate support member 15 is pivotally fixed by the axis 16 and the combination of the item 30 and the support member 18. This may be expressed by the following equations:

$$Fa*L_1 = Fi*L_2 \quad (III)$$

$$Fi*L_3 = Fd*L_4 \quad (IV)$$

Substituting Fa in equation (III) by expression (II) and substituting Fd in equation (II) by expression (I) results in $$(m+m_2)*g*L_1 = Fi*L_2 \quad (V)$$

$$Fi*L_3 = m*g*L_4 \quad (VI)$$

Isolating Fi in both these equations shows the following:

$$Fi = (m+m_2)*g*L_1/L_2 \quad (VII)$$

$$Fi = m*g*L_4/L_3 \quad (VIII)$$

By combining (VII) and (VIII)

$$m*g*L_4/L_3 = (m+m_2)*g*L_1/L_2 \quad (IX)$$

and isolating $L_4$, the following expression is presented:

$$L_4 = L_1*L_3/L_2*(m+m_2)/m \quad (X)$$

Thus, by designing a mechanism in accordance with the invention and in such a manner that the above equation is fulfilled, a balanced mechanism is achieved. However, it can also be seen that if $m_2$ is insignificant in relation to m or $m_2 \ll m$, a simplified expression is presented:

$$L_4 = L_1*L_3/L_2 \quad (XI)$$

Thus, by suitable dimensioning of the distances $L_4$–$L_1$, a balanced mechanism is achieved, basically irrespective of the mass of the item or apparatus supported by the mechanism. It should be understood, however, that the length $L_4$, i.e. the horizontal distance from the axle 19 to the center of gravity 32, will vary depending on the tilt angle. However, for minor angle magnitudes, this will be insignificant and will only have limited effect on the perfect state of balance which will be comparable to or less than the influence caused by static friction, etc.

The principle of the balanced mechanism is further illustrated by the following examples:

For all examples
$m_2$=1 kg
$L_1$=39 mm
$L_2$=15 mm
$L_3$=39 mm
For example 1
m=10 kg
For example 2
m=20 kg
For example 3
m=30 kg If the simplified expression (XI) is utilized, the calculated distance $L_4$=101.4 mm:

For example 1, the calculated distance $L_4$=111.54 mm
For example 2, the calculated distance $L_4$=106.47 mm
For example 3, the calculated distance $L_4$=106.78 mm In the following, a second embodiment according to the invention will be described with reference to FIGS. 6-13.

This embodiment essentially corresponds to the first embodiment described above. The mechanism has, however, been encased in a support casing and a number of modifications has been introduced.

It is illustrated in FIGS. 6 and 7 that the tilt mechanism comprises a support member 18 with two support arms in the shown example. This support member 18 is connected to a support plate or bracket 40 which carries the display panel or screen 2. At the other end, the support member 18 is connected to a mechanism situated in a support casing 42. As shown, this support casing may be in the form of a cylindrical device which is connected to a support base 44. As shown, the support base 44 may be designed as a wall mount, e.g. by fixing to a wall or a similar element, with screws or the like through fixing holes 36. It should be understood that the support base may be designed in any other suitable manner, e.g. as a floor stand, a table stand etc.

FIG. 8 illustrates the tilt mechanism 1 in an enlarged view without a display panel, illustrating that the support casing 42 comprises a slit 48, or rather a slit 48 for each of the support arms of the support member 18. These slits are designed to accommodate the movements of the support member 18 when the display panel is tilted, for example moved upwards or downwards. Further, it is shown that the support bracket 40 comprises upper bracket parts 46 and lower bracket parts 47 for holding a display panel.

FIG. 9 illustrates the tilt mechanism in a perspective view, further illustrating that the support plate or bracket 40 may be connected to the support member 18 by fixing means through fixing holes 49 in the bracket.

The tilt mechanism 1 according to this second embodiment is illustrated in further detail in FIG. 10, showing the elements in an exploded view. However, in this figure, a fully assembled movable support member 50 is shown. This component will be described in detail later on. The movable support member 50, which essentially corresponds to the movable support member 10 described in connection with the first embodiment, is connected to two support arms 54 and constitutes the support member 18 together with the support bracket 40 as described above. The movable support member 50 is enclosed in the support case 42 which also comprises a pinion rack 52, essentially corresponding to the pinion rack 20 described above. The pinion rack 52 cooperates with the movable support member 50, allowing this to move upwards when a display panel is tilted downwards and vice versa. The support casing 42 is closed at the top with a top cap 57 joined to the support casing 42 with fixing means 59 such as screws etc. Further, the support casing may be fitted with a top lid 58, for example for aesthetic reasons. Similarly, the support casing 42 is closed at the bottom with a bottom cap 55, joined to the support casing 42 with fixing means 56 such as screws etc. Further, a swivel bearing 60 may be situated at the bottom. This bearing may cooperate with a bushing 53 located in a lower part of the support base 44 allowing a display panel to be turned. Finally, a fixing pin arrangement 51 is shown, which arrangement may serve to locate the mechanism in the vertical direction, e.g. preventing the swivel bearing and the support casing from being lifted up from the support base 44.

The support case 42, the pinion rack and the movable support member 50, now in exploded form 70, are illustrated in FIG. 11. The elements of the movable support member 70 shown in FIG. 11 will be described in further detail with reference to FIG. 12.

In FIG. 12, the movable support member comprises a frame assembly having two frame parts 72 and 73. These are held together by fixing means 94 such as screws etc. Further, the frame comprises guiding rollers 95 placed at each side, for example two at each side. These guiding rollers 95 are supported by axle pins 92 carried by bearings 93 situated in the frame 72 and 73. The guiding rollers 95 are designed for cooperation with guiding means 98, e.g. grooves, slots or similar means, extending in the longitudinal direction of the support casing 42 as illustrated in FIG. 13.

A number of elements are located between the frame parts 72 and 73, and they are carried by axle pins 86, 87 and 88. It should be understood that the arrangement illustrated in FIG. 12 is symmetrical in relation to a vertical plane defined by the abutting surfaces of the frame parts 72 and 73. Further, it should be understood that similar elements are placed above and below a horizontal plane defined by the middle axle pin 87.

As shown, the middle axle pin 87 carries two support member wheels 74 and an intermediate gear wheel 82. The upper 86 and the lower 88 axle pin each carries two intermediate sector wheels 78. The support member wheels 74 comprise means 76, e.g. threaded tap holes, for establishing a connection to the support arms 54 (FIG. 10). It should be understood that the support member wheels 74 form part of a member 18. Further, these support member wheels 74 comprise a gear portion 75. This gear portion cooperates with a second gear portion 90 situated on an intermediate sector wheel 78. This sector wheel further comprises a first gear portion 79 which, on its part, may cooperate with an inner gear part 84 of the intermediate gear wheel 82, i.e. an inner gear part 84 placed at each side of the gear wheel 82. Finally, this wheel 82 comprises an outer gear part designed to cooperate with the pinion rack 52.

The above-described arrangement according to the second embodiment of the invention will operate in a fashion similar to the one described in relation to the first embodiment. Thus, an important feature is that the center of gravity of the display panel or a similar device will essentially remain in the same position irrespective of the tilt angle of the panel.

The function of this arrangement will be explained with reference to FIG. 12 and especially the part situated at the upper left-hand corner in the figure. It should be understood that when a display panel or another device is tilted upwards, the support member wheel 74 will rotate in the clockwise direction. Hereby, the upper intermediate sector wheel 78 will turn in the anti-clockwise direction, which is caused by the cooperation of the gear portion 75 and the second gear portion 90. Further, the intermediate gear wheel 82 will turn in the clockwise direction, which is caused by the cooperation of the first gear portion 79 and the inner gear part 84. The cooperation between the outer gear part 83 and the pinion rack 52 will cause the movable support member 50 to move downwards, whereby the center of gravity of the display panel or a similar device will remain in its predetermined position or at least in an essentially stable position. Similarly, the center of gravity of the display panel or a similar device will remain in its predetermined position or at least in an essentially stable position when the display panel is tilted downwards.

A third embodiment of the invention is illustrated in FIGS. 14 to 17 and shows a tilt mechanism generally designated 100 in connection with a table stand, although it should be understood that this embodiment relate to any form of stand or support for a display panel or another device, e.g. a floor stand, a wall support etc.

As shown in FIG. 14, a display panel 2 may be connected to a support member 118 carried by a support structure casing 102. As shown, this element 102 may be placed on a base part 101, in the form of e.g. a footplate. The support structure casing 102 may comprise one or more apertures, openings, slits etc. such as 103 and 104, which may serve to lead cables, wires etc., such as antenna cables, power cables, signal wires etc., from/to the interior of the casing 102 and to/from the display panel 2.

The mechanism according to this embodiment is illustrated schematically in FIG. 15, which illustrates a pivotally supported item 30 connected to a member 118. This member 118 is connected to a movable support member 110 at its other end. The movable support member 110 will be described in detail in the following, but as shown in FIG. 15, it is carried by a support structure 106 having a curved guiding slot or aperture 108. This guiding slot or aperture 108 and/or the movable support member 110 is designed in such a manner that when the item 30 is tilted as indicated by the arrows, the center of gravity 32 of the item will remain stable or essentially stable. It should thus be understood that the item 30 will remain in any position in which it is placed and that an adjustment of the position, e.g. the tilt angle may be performed by using practically no energy apart from the amount of energy or force sufficient to overcome friction, static friction etc. As shown, the guiding slot or aperture 108 may be designed with a curvature corresponding to part of a circle having a radius 111 and centered at the center of gravity 32.

A detailed example of this third embodiment is shown in FIG. 16 in a partly exploded view. A support structure casing 102 supported on a base part 101 is shown, and a further support member 118 is illustrated. This support member 118 is shown with a bracket at one end for attachment to the rear of a display panel and with means, e.g. support member fixing elements 119, such as screws, at the other end for establishing a connection through slits 105 to the movable support member 118 shown in assembled form in FIG. 16. The movable support member 118 is carried by a support structure comprising two support structure parts 106a and 106b. Each of these two parts comprises guiding slots or apertures 108a (not shown) and 108b, respectively, in the general shape of parts of a circular curve and designed for cooperation with guiding rollers 120, for example four, placed on the exterior of or protruding from the movable support member 110.

The two support structure parts 106a and 106b are designed for assembly by means of e.g. a fixing bracket 114 having a number of projections 115 for cooperation with fixing holes 112 in the parts 106a and 106b. Further, a lower 125 and an upper 124 end stop may be featured in the support structure 106 and located by means of holes or similar means in the two structure parts. It should be understood that these end stops may be located in a number of different positions, corresponding to different location holes in the structure parts, whereby end stop positions for the display panel may be adjusted to actual requirements of use, e.g. use for a wall support, a table stand, a floor stand etc.

Further, it should be understood that the two parts 106a and 106b accommodated in the support structure casing 102 are guided or located by guiding structures indicated by 107. Finally, a top lid 116 may close the upper part of the support structure casing 102.

The movable support member 110 will now be described in further detail with reference to FIG. 17. A base part 130 is designed with housings 134 for accommodating bearings 123. Each of these bearings 123 supports an axle pin 122 which protrudes through side covers 132 and 133 and carries guiding rollers 120. Further, the base part 130 comprises tap holes 138, such as threaded tap holes, for establishing a connection to a support member 118 by means of e.g. screws 119 as shown in FIG. 16. Finally, FIG. 17 shows that the base part may comprise a housing 139 for a friction element, e.g. a friction element comprising a friction body 143 and a spring 145. It should be understood that such a friction element, which may protrude through openings 141 in the side covers 133 and/or 132 and contact the support structure part 106a and/or 106b, may serve the purpose of maintaining a display panel in a desired position, e.g. to prevent unintentional movement caused by e.g. casual contact by a person and/or by circumstances causing a less than ideal situation, e.g. when the center of gravity is not exactly coincident with the center of rotation.

The invention has been exemplified above with reference to specific examples. However, it should be understood that the invention is not limited to the particular examples described above but may be used in connection with a wide variety of applications. Further, it should be understood that the mechanism according to the invention may be designed in a multitude of varieties within the scope of the invention as specified in the claims.

The invention claimed is:

1. Tilt mechanism for a device, said mechanism comprising
   a support member for supporting said device,
   a movable support member, and
   a support structure,
   wherein said support member is supported by said movable support member,
   wherein said movable support member is supported by said support structure,
   wherein said mechanism is arranged for supporting said device essentially in a lateral direction of said movable support member, and
   wherein said support member and said movable support member are linked in such a manner that a forward tilt of said support member corresponds to an upwards displacement of said movable support member and vice versa.

2. Tilt mechanism according to claim 1, wherein said support structure comprises a part extending in an essentially vertical direction.

3. Tilt mechanism according to claim 1, wherein said support member is arranged for transferring rotational movement and in an essentially transverse direction in relation to said support structure.

4. Tilt mechanism according to claim 1, wherein said support structure comprises means for guiding said movable support member.

5. Tilt mechanism according to claim 4, wherein said means for guiding said movable support member are designed for rectilinear guidance.

6. Tilt mechanism according to claim 4, wherein said means for guiding said movable support member are designed for non-rectilinear guidance.

7. Tilt mechanism according to claim 4, wherein said movable support member comprises corresponding guiding means for cooperation with said guiding means comprised by the support structure.

8. Tilt mechanism according to claim 4, wherein said guiding means and/or said corresponding guiding means comprise an aperture, a recess, a slot, a roller, a rail and/or a tap.

9. Tilt mechanism according to claim 1, wherein said support member is connected to said movable support member in a fixed relationship.

10. Tilt mechanism according to claim 1, further comprising:
    an intermediate member for transferring rotational movement,
    wherein said support member is arranged for transferring rotational movement,
    said movable support member provides support to said support member and said intermediate member,
    said support structure comprises force-transferring means,
    said support member and said intermediate member are linked, and
    said intermediate member comprises means for transferring rotational movement to displacement in relation to said support structure.

11. Tilt mechanism according to claim 10, wherein said support member is pivotally supported by said movable support member.

12. Tilt mechanism according to claim 10, wherein said intermediate member is pivotally supported by said movable support member.

13. Tilt mechanism according to claim 10, wherein said movable support member is translatorily supported by said support structure.

14. Tilt mechanism according to claim 10, wherein said support member and said intermediate member are linked by means of force-transferring means.

15. Tilt mechanism according to claim 14, wherein said force-transferring means comprises a toothed surface in the form of a gear wheel or a section of a gear wheel.

16. Tilt mechanism according to claim 10, wherein said support structure comprises an element for direct or indirect interaction with said intermediate member.

17. Tilt mechanism according to claim 16, wherein said element for interaction with said intermediate member comprises a toothed surface.

18. Tilt mechanism according to claim 17, wherein said intermediate member comprises a toothed surface for interaction with the support structure.

19. Tilt mechanism according to claim 16, further comprising an element for establishing said indirect interaction between said intermediate member and said support structure.

20. Tilt mechanism according to claim 19, wherein said at least one further element is in the form of a gear wheel or at least a section of a gear wheel.

21. Tilt mechanism according to claim 1, further comprising a casing for enclosing at least part of said mechanism.

22. Tilt mechanism according to claim 21, wherein said casing is structurally connected to said support structure.

23. Tilt mechanism according to claim 1, wherein said movable support member comprises a frame having guiding means for cooperation with corresponding means located in said support structure or in a part thereof.

24. Tilt mechanism according to claim 1, further comprising a swivel mechanism forming part of the support structure.

25. Display device comprising a display panel, a support for said display panel and a tilt mechanism according to claim 1.

26. Display device according to claim 25, wherein said display panel is a flat screen display.

* * * * *